United States Patent [19]
Hecht et al.

[11] Patent Number: 6,131,159
[45] Date of Patent: Oct. 10, 2000

[54] SYSTEM FOR DOWNLOADING PROGRAMS

[75] Inventors: Gideon Hecht, Seminole; Kurt Ervin Holmquist, Largo; Donald C. Snoll, Clearwater, all of Fla.

[73] Assignee: Paradyne Corporation, Largo, Fla.

[21] Appl. No.: 07/880,257

[22] Filed: May 8, 1992

[51] Int. Cl.⁷ .................................................. G06F 9/445
[52] U.S. Cl. ................................. 713/1; 713/100; 711/1
[58] Field of Search ................................. 395/700, 651, 395/652, 653, 712; 364/DIG. 1, DIG. 2; 713/1, 2, 100; 711/114, 1, 145, 202–206; 710/23, 104

[56] References Cited

U.S. PATENT DOCUMENTS

| | | | |
|---|---|---|---|
| 4,430,704 | 2/1984 | Page et al. | 395/700 |
| 4,459,662 | 7/1984 | Skelton et al. | 364/200 |
| 4,626,986 | 12/1986 | Mori | 395/700 |
| 4,654,783 | 3/1987 | Veres et al. | 713/2 |
| 4,663,707 | 5/1987 | Dawson . | |
| 4,720,812 | 1/1988 | Kao et al. | 364/900 |
| 4,724,521 | 2/1988 | Carron et al. | 395/700 |
| 5,053,990 | 10/1991 | Kreifels et al. | 364/900 |
| 5,126,808 | 6/1992 | Montalvo et al. | 357/23.5 |
| 5,136,711 | 8/1992 | Hugard et al. | 395/652 |
| 5,142,623 | 8/1992 | Staab et al. | 709/200 |
| 5,210,854 | 5/1993 | Beaverton et al. | 395/500 |
| 5,257,380 | 10/1993 | Lang | 395/700 |
| 5,268,928 | 12/1993 | Herh et al. | 375/222 |
| 5,280,627 | 1/1994 | Flaherty et al. | 395/700 |
| 5,297,258 | 3/1994 | Hale et al. | 711/114 |
| 5,321,840 | 6/1994 | Ahlin et al. | 395/712 |
| 5,355,498 | 10/1994 | Provino et al. | 395/700 |
| 5,361,365 | 11/1994 | Hirano et al. | 395/775 |
| 5,367,686 | 11/1994 | Fisher et al. | 395/700 |
| 5,367,688 | 11/1994 | Croll | 395/700 |
| 5,572,572 | 11/1996 | Kawan et al. | 379/90.01 |
| 5,579,522 | 11/1996 | Christeson et al. | 713/2 |

FOREIGN PATENT DOCUMENTS

| | | | |
|---|---|---|---|
| 2015305 | 12/1990 | Canada | G06F 12/14 |
| 0 205 692 | 6/1985 | European Pat. Off. | G06F 9/44 |
| 0 500 973 A1 | 2/1991 | European Pat. Off. | G06F 9/445 |
| 0 524 719 A2 | 5/1992 | European Pat. Off. | G06F 9/44 |
| 2 227 584 | 8/1990 | United Kingdom | G06F 12/12 |

OTHER PUBLICATIONS

Electronic Engineering, vol. 64, No. 783, "SGS–Thomson Block Erase Flash in 16 Bit RISC Controller", Mar. 1992, Woolrich, London, GB, p. 83.

IBM Technical Disclosure Bulletin, vol. 34, No. 3, Aug. 1991, Armonk, NY, US, pp. 286–289.

*Primary Examiner*—Thomas C. Lee
*Assistant Examiner*—Rijue Mai
*Attorney, Agent, or Firm*—Thomas, Kayden, Horstemeyer & Risley LLP

[57] ABSTRACT

A modified version of the operating communication program of a stored program controlled apparatus is installed with the aid of a downloadable start address specification means, optionally realized with an EEPROM memory. The start address specification means stores information that is downloaded through a communication port in the apparatus, and that information is used in defining the address from where the communication programs are initiated. In accordance with the method of this invention, downloading of the entire new set of programs is effected by first downloading a segment of the essential portion of the new package of programs. Control is then transferred to the new segment by downloading appropriate information into the start address specification means. Thereafter, utilizing the downloaded essential portion of the new package of programs, the remainder of the new package is downloaded.

21 Claims, 1 Drawing Sheet

SYSTEM FOR DOWNLOADING PROGRAMS

BACKGROUND OF THE INVENTION

This invention relates to stored program controlled apparatus and, in particular, to apparatus with a capability for remote updating of its entire set of programs.

Stored program controlled apparatus can conveniently be divided into two types; one where the stored programs are completely unalterable under normal operating circumstances, and the other where the stored programs are alterable, at least at times, during normal operation. In apparatus of the first type, the program is often executed automatically and the user does not even know that the controlled apparatus is "stored program controlled". This is typically the case in equipment that is designed for people who are not knowledgeable in computers and for whom the equipment is just a tool of the trade. "Point of sale" terminals, such as check-out terminals at a supermarket, are a good example. Modems are another example. People who use this equipment desire fail-safe operation and they do not want to be bothered with loading programs, fixing program bugs, installing updated versions of software, etc.

One approach to programming such equipment is to imprint the program into read-only-memory integrated circuits and physically install the circuits into the equipment. The problem with this approach is that updated versions of the program require the creation of new sets of read-only memories and new installations.

When a communication link is present, "downloading" the programs to the equipment from a remote processor, through the communication link, forms another approach for programming the equipment. It has been known in the art for some time that it is feasible to download limited types of control information from a remote processor. It is also known to download entire machine language application programs. Often such equipment does not include writable non-volatile store, such as a hard disk, so the programs are stored in battery protected read/write memories. This is an unattractive solution because it leaves a substantial portion of program memory to be at risk. To mitigate this problem, U.S. Pat. No. 4,724,521, suggests storing within read-only memories of the local equipment a number of general purpose routines which comprise instructions to be executed by the central processing unit to accomplish a particular program task. These, in effect, form a set of macro-instructions. The downloaded machine language program utilizes these macro-instructions to the extent possible, and thereby achieves flexibility without the need to download substantial amounts of program code.

In all of the known approaches, however, there is a program portion in the local equipment that is resident in a read-only memory, and its contents are not changed. That resident portion contains "boot-up" segments and program segments that are necessary to maintain the communication between the remote processor and the local equipment (so that the process of downloading the programs can continue). This set of programs is the "essential programs" (EP) set. This set of programs should, of course, be a non-volatile store because there is always a possibility of power loss.

The fact that the EP set is needed to maintain communications presents a problem when the EP set itself needs to be modified or updated. Indeed, that is often the case with modems, where essentially the sole function of the modem software is to support communication.

SUMMARY OF THE INVENTION

The problem of downloading a modified version of the operating communication program, and the problem of effectively updating the entire set of programs in a stored program controlled apparatus, such as a modem, is solved with a downloadable start address specification means and, optionally, with an EEPROM memory. The start address specification means stores information that is downloaded through the communication link, and that information is used in defining the address from where the communication link programs are initiated.

In accordance with the method of this invention, downloading comprises what may be considered two communication segments. In the first segment the essential portion of the new package (EP set) of programs is downloaded to some chosen location in the local apparatus and the downloadable start address specification means is loaded with the appropriate new start address. Utilizing the most recently downloaded EP set of the new communication package, the second segment downloads the remainder of the new package.

DETAILED DESCRIPTION

A modem's primary function is to enable communications between a customer's digital equipment and a remote apparatus over a transmission medium. In a modem with a stored programmed controlled architecture this communication is effected with a set of programs, which includes call establishment programs, link layer protocols with flow control and error recovery functions, and programs that handle and store the communicated data, as well as the modulation and demodulation programs used by the modem. These programs occupy a significant portion of the modem's program memory. In accordance with this invention, all programs—including the EP set of programs that carry out the elemental communications—are downloadable. That is, the apparatus employing the principles of this invention does not need to have a non-volatile "boot-up" read-only-memory. All programs (including the boot-up programs) can be stored in a single memory arrangement which, for some applications, can consist of just two memory blocks.

Figure 1:
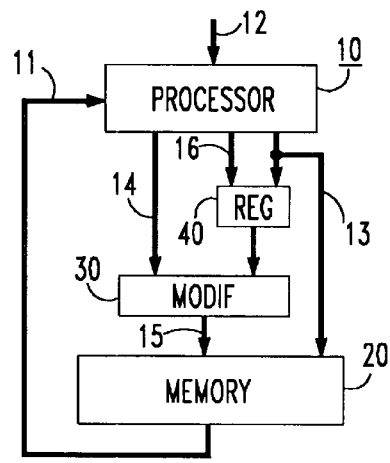
FIG. 1 presents a block diagram of an arrangement for carrying out this invention.

FIG. 1 depicts one structure that, in conformance with the principles of this invention, enables the downloading of programs to the modem's program memory. FIG. 1 includes a processor element 10 with a port for receiving signals from, and sending signals to, line 12. Processor 10 is also responsive to line 11 data from program memory 20, and it supplies address and data to memory 20 via bus 13 and bus 14, respectively. In a conventional processor structure, bus 14 is connected to an address port of memory 20. In FIG. 1, address modifier 30 is interposed between processor 10 and program memory 20, with bus 15 supplying the address information to memory 20. Modifier 30 is responsive to register 40, which is loaded with bus 13 data when the register is enabled by bus 16. Modifier 30 is a modulo M adder, where M is the size of memory 20. A typical stored program controlled modem also includes a read/write data memory, means for interfacing with the transmission medium, means for interfacing with the local digital equipment, and perhaps other data and control ports. For purposes of this invention, however, these other elements are irrelevant, so they are not included in the drawing.

It should be understood that line 12 in the FIG. 1 architecture effectively offers a "remote execution" capability to processor 10, in that the programs which are executed by processor 10 are affected by data supplied by line 12. For example, data supplied by line 12 can effect branching to programs that are normally dormant. One such normally dormant program is a program that downloads information to the program memory. It should also be understood, and noted, that although this invention is described in connection with modems, its principles are applicable to all stored program apparatus. In particular, the principles of this invention are applicable to all situations where it is desirable to download an entire set of new programs, including the EP set. For example, this invention is useful in PCs, "point of sale" terminals, etc.

The operation of the FIG. 1 apparatus is quite simple. The processes carried out by the FIG. 1 apparatus are effected by executing a sequence of instructions that the processor receives from program memory 20 via bus 11. In turn, processor 10 determines which instructions are delivered to it by controlling the addresses applied to memory 20 (typically by controlling a "program counter" within processor 10, which is not shown in the FIG.). The primary difference between a conventional microprocessor arrangement and the FIG. 1 arrangement is that the addresses supplied on bus 14 are not the actual addresses that are applied to program memory 20, because of the interposed circuit 30. One might call these addresses "virtual addresses", which are translated into the real addresses by the additive constant applied by register 40 to modifier circuit 30.

The exact structure and organization of the programs executed by the FIG. 1 arrangement is not really relevant to this invention, but it is to be understood that a protocol exists for sending information out on line 12 and for receiving information from line 12. This protocol provides a mechanism for intelligent communication with processor 10, which includes, for example, knowing when the received data is commands or data, and whether to store the received data in memory 20 or elsewhere.

The programs that can be executed by the FIG. 1 arrangement reside throughout memory 20, but the set of programs that is essential to the maintenance of communication with line 12 (the EP set) may, advantageously, occupy a contiguous segment of memory 20 addresses in the range 0 to N. Within that range of addresses there is a subroutine for installing a new EP set.

Figure 2:
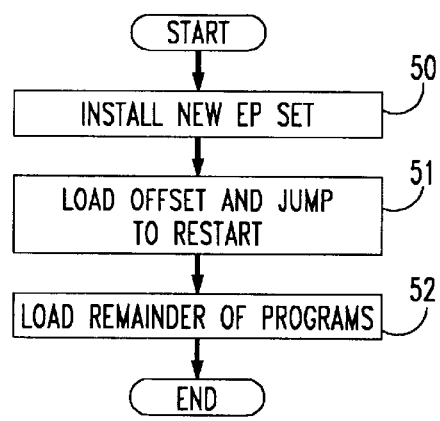
FIG. 2 is a flow diagram of a downloading process in accordance with this invention.

In accordance with the principles of this invention, the entire set of programs contained in memory 20 can be over-written with a new set of programs (in a process initiated by the apparatus itself or by the party connected to the apparatus via line 12) by following the procedure outlined in FIG. 2. In step 50 of FIG. 2, a command is received on line 12 to branch to the subroutine in the EP set that installs new EP sets (that command may simply be a data word that is installed in a particular read/write memory location). After supplying the branch instruction, the new EP set of programs are downloaded via line 12. Optionally, an offset address that is the starting address of the new EP set (the address corresponding to 0 in the existing EP set) is also downloaded. Alternatively, the offset address may be predefined, in which case it does not need to be supplied by line 12. In any event, the offset address is greater than N and less than M−N. It may be noted that N must be less than M/2, because two EP sets must temporarily coexist in memory 20.

After the new EP set is installed in memory locations X through X+N, where X is the offset address (X=M/2, for example), memory locations that serve as software-defined registers in the new EP set are populated with data that is found in the corresponding software-defined addresses in the active EP set. Thereafter, according to step 51, register 40 is loaded with the offset address.

The immediate effect of loading the offset address into register 40 is to transfer control to the newly installed EP set. That means that the program in the new EP set to which control is transferred, must be at a predetermined logic point so that the communication can continue seamlessly. This minor requirement can be easily accommodated by proper planning of the new EP set. Once operation proceeds under control of the new EP set of programs, according to FIG. 2, step 52 conditions processor 10 to account for the offset present in register 40 and loads the remainder of programs destined for memory 20 in addresses higher than X+N (modulo M).

It is obviously important to protect the information loaded into memory 20 from loss. At the very least, that means that memory 20 must be non-volatile. Currently, we use an electrically bulk erasable, programmable, read-only memory (FLASH EEPROM) to form memory 20. This memory must be erased in bulk before new information can be written in it. To install a new EP in such a memory, it is recalled that the EP set must occupy less than half of memory 20, and that makes it convenient to construct memory 20 from at least two distinct erasable memory blocks (distinct in the sense of being able to erase one and not the other). Each segment of the downloading process begins with a bulk erasure of one of the memory 20 halves.

To summarize the downloading process of this invention,
1. Bulk erase the that half of memory 20 which does NOT contain the EP set of programs;
2. download a new EP set of programs to the erased half of memory 20;
3. download the offset address to pass control to the new EP set of programs;
4. bulk erase the other half of memory 20;
5. download the remainder of programs into memory 20.

If register 40 is to contain the offset address for a substantial time after downloading is accomplished, then its contents must be protected in a manner not unlike that of memory 20. Of course, register 40 can manufactured together with memory 20 and be an EEPROM. However, that is not absolutely necessary, and manufacturing costs could benefit if register 40 were constructed as part of the read/write memory or as part of processor 10.

Figure 3:
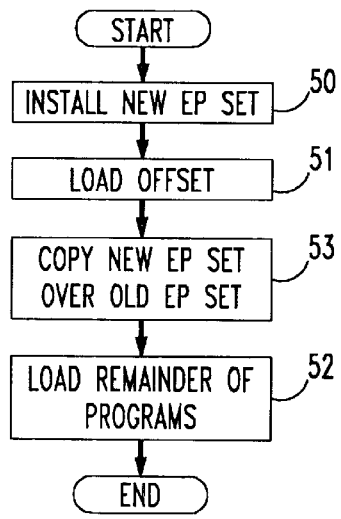
FIG. 3 is a flow diagram of an augmented downloading process in accordance with this invention.

Register 40 may be a volatile memory if the downloading process is carried out as depicted in FIG. 3. Specifically, by including a copy subroutine in the EP set of programs, the downloading process can be modified to the following (assuming the EP set is in the first half of memory 20):
1. Bulk erase the second half of memory 20;
2. download a new EP set of programs to the second half of memory 20;
4. download the offset address to pass control to the new EP set of programs;
5. bulk erase the first half of memory 20;
6. copy the contents of the second half of memory 20 into the first half of memory 20;
7. reset the offset address to 0; and
8. download the remainder of programs into memory 20.

Admittedly, during the copy sequence (which may also be a "move" sequence) the arrangement is vulnerable to power failures. Since the time of copying or moving is very small, this is a very unlikely event. Still, to protect against this unlikely event, the power source can be designed to have sufficient reserve to complete the copy operation, or to protect the starting address. A capacitor at the output of the power supply may supply the necessary power reserve.

In the arrangement described above where memory 20 consists of two FLASH EEPROM chips, register 40 needs to have only one bit of memory, and modifier circuit 30 can be merely an Exclusive OR gate which, with the aid of the one bit memory of register 40, selects the bank of memory that is active.

What is claimed is:

1. A system comprising:
   (a) a processor;
   (b) a memory, and a set of programs stored in said memory that are executed when the system needs to be initialized, said memory being of a type which may be completely updated in its entirety but which is not volatile, said memory being the only program memory in said system; and
   (c) alterable storage means for holding a displacement multi-bit memory address that is used to point to the starting address accessed by the processor when initializing.

2. The system of claim 1 wherein said memory is an EEPROM memory.

3. The system of claim 1 wherein said memory consists of 2-FLASH EEPROM devices.

4. The system of claim 1 wherein said alterable storage means is an EEPROM memory.

5. The system of claim 1 further comprising translation means interposed between said alterable storage means and said memory, wherein said alterable storage means holds an address that translates between addresses directed to the memory via said translation means and addresses actually applied to the memory by said translation means.

6. A system comprising:
   (a) a processor;
   (b) a memory coupled to said processor, said memory being the only program memory in the system, said memory being completely updatable in its entirety but non-volatile, there being a set of programs stored in said memory that are executed when the system needs to be initialized; and
   (c) alterable memory means for storing a multi-bit memory address that controls the starting address accessed by the processor when initializing.

7. The system of claim 6 further comprising means for receiving a trigger signal at a telecommunications input port of the system to begin execution of said programs.

8. A system comprising;
   (a) a processor;
   (b) a memory and a communications port coupled to said processor, said communications port being adapted to communicate with devices which are external to said system, said memory being completely updatable in its entirety but non-volatile;
   (c) a program module in said memory that, when activated by said processor, effects communication with said port; and
   (d) operationally alterable means for setting the starting address of said program, which address is supplied to said system via said communication port.

9. The system of claim 8 wherein:
   (a) said memory contains a first set of programs and a second set of programs;
   (b) said memory is at least twice the size of the size of the first set of programs; and
   (c) said operationally alterable means sets the starting position of the program executed by said processor in connection with communication with said port at a second specified location that is M removed from the first location, M being half the size of said memory.

10. A system comprising:
    (a) a processor;
    (b) a communication port coupled to said processor, said communication port being adapted to communicate with devices which are external to said system;
    (c) a memory coupled to said processor, said memory being non-volatile and capable of being completely updated in its entirety, said memory containing programs, including a set of programs that are executed when the system needs to be initialized and a program for controlling communication through said communication port; and
    (d) means for activating said program for controlling communication and receiving information through said communication port to modify the programs in said memory, said information including the program for controlling communication through said communication port and a command that is executed by said processor effectively when it is received.

11. The system of claim 10 wherein the communication port is a telecommunication port.

12. The system of claim 10 wherein the communication port is a telecommunication port and the programs execute the functions of a modem.

13. The system of claim 10 where the communication port receives commands to be executed by the processor and data to be stored in the memory.

14. The system of claim 10 wherein said means for receiving includes means for altering the program according to the information obtained by the means for receiving.

15. The system of claim 10 wherein said means for receiving modifies the programs by altering a portion of the memory contents pursuant to data received via said communication port.

16. The system of claim 10 wherein said means for receiving modifies the programs by replacing them with program data received via said communication port.

17. The system of claim 10 where the means for altering alters all of the programs in the system in a single communication session with said communication port.

18. A system comprising:
    (a) a processor;
    (b) a memory coupled to said processor, said memory being of a type, which is completely updatable in its entirety but non-volatile;
    (c) a set of program means stored in said memory that are activated when said system needs to be updated wit a new set of programs, and
    (d) alterable storage means for holding an offset memory address that is used to point to a starting address accessed by said processor when initializing.

19. The system of claim 18 wherein said memory is an EEPROM memory.

20. The system of claim 18 wherein said memory consists of 2 FLASH EEPROM devices.

21. The system of claim 18 wherein said alterable storage means is an EEPROM memory.

* * * * *

UNITED STATES PATENT AND TRADEMARK OFFICE
CERTIFICATE OF CORRECTION

PATENT NO. : 6,131,159
DATED : October 10, 2000
INVENTOR(S) : Hecht, et al.

It is certified that error appears in the above-identified patent and that said Letters Patent is hereby corrected as shown below:

Column 4, line 40, insert "be" between "can" and "manufactured".

Column 6, line 49, delete "," after "type".

Column 6, line 52, change "wit" to --with--.

Signed and Sealed this

Twenty-fourth Day of April, 2001

Attest:

NICHOLAS P. GODICI

Attesting Officer

Acting Director of the United States Patent and Trademark Office